United States Patent [19]
Koslow

[11] Patent Number: 5,946,342
[45] Date of Patent: Aug. 31, 1999

[54] PROCESS AND APPARATUS FOR THE PRODUCTION OF ACTIVATED CARBON

[75] Inventor: Evan E. Koslow, Weston, Conn.

[73] Assignee: Koslow Technologies Corp., Orange, Conn.

[21] Appl. No.: 09/148,441

[22] Filed: Sep. 4, 1998

[51] Int. Cl.⁶ .................................................. H05B 3/60
[52] U.S. Cl. .......................................... 373/120; 373/109
[58] Field of Search .................................... 373/120, 109, 373/115, 79

[56] References Cited

U.S. PATENT DOCUMENTS

| | | |
|---|---|---|
| 4,025,610 | 5/1977 | Suzuki et al. . |
| 4,127,737 | 11/1978 | Hirakawa . |
| 4,139,489 | 2/1979 | Mizuno et al. . |
| 4,149,023 | 4/1979 | Mizuno et al. . |
| 4,192,962 | 3/1980 | Nakao et al. . |
| 4,261,857 | 4/1981 | Nakao . |
| 4,357,210 | 11/1982 | Aubry et al. . |
| 4,398,295 | 8/1983 | Mihara et al. . |
| 4,472,245 | 9/1984 | Halm . |
| 4,624,003 | 11/1986 | Eirich et al. . |
| 4,635,273 | 1/1987 | Wlikening ............................... 373/120 |
| 4,655,968 | 4/1987 | Queiser et al. . |
| 4,760,585 | 7/1988 | Queiser et al. . |
| 4,807,246 | 2/1989 | Moss . |
| 4,867,848 | 9/1989 | Cordier et al. . |
| 5,089,457 | 2/1992 | Gayland et al. . |
| 5,173,921 | 12/1992 | Gaylord et al. . |
| 5,190,901 | 3/1993 | Hirai . |
| 5,287,383 | 2/1994 | Hirai . |
| 5,317,592 | 5/1994 | Van Staden . |
| 5,406,582 | 4/1995 | du Plessis . |
| 5,579,334 | 11/1996 | Baxter et al. . |
| 5,694,413 | 12/1997 | Durr et al. . |

*Primary Examiner*—Teresa Walberg
*Assistant Examiner*—Quang Van
*Attorney, Agent, or Firm*—Ohlandt, Greeley, Ruggiero & Perle

[57] ABSTRACT

An improved process and apparatus for the production and reactivation of activated carbon comprising the passing of a substrate through one or more zones defined by electrodes. Electrical energy passing through the bed of substrate creates heat that supports the devolatilization and activation of the substrate. Steam, carbon dioxide, or an alternative gas can be used to support the activation process, while other zones can be filled with inert gas such as nitrogen to promote pyrolysis reactions. Preferably, these gases pass through the bed in a co-current downward flow with the carbon to prevent fluidization and arcing within the bed.

13 Claims, 5 Drawing Sheets

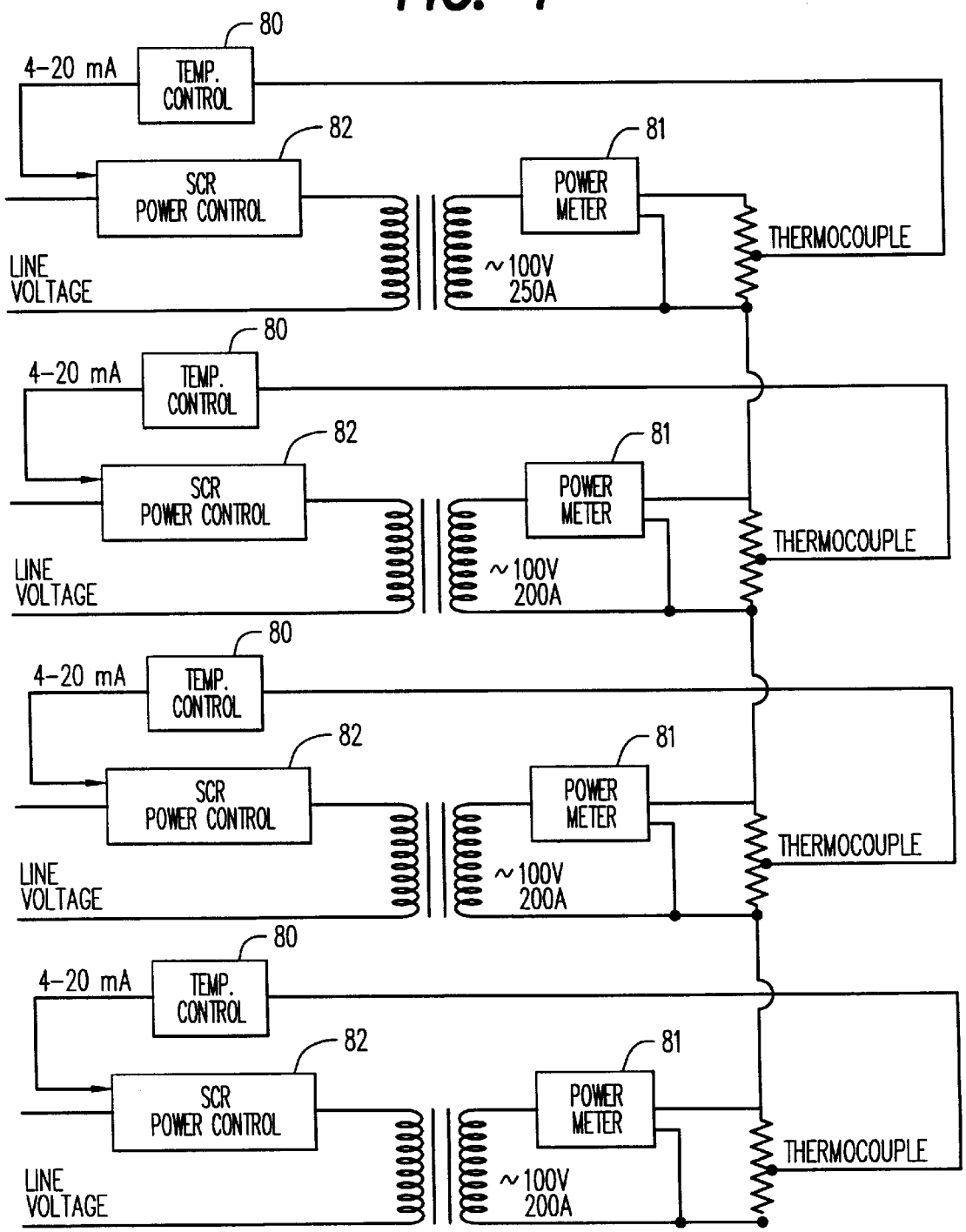

PROCESS AND APPARATUS FOR THE PRODUCTION OF ACTIVATED CARBON

The present invention generally relates to an apparatus and process for the activation and reactivation of carbon having approximately 50% greater efficiency than conventional activated carbon processes. In particular, it relates to an integrated method of producing char and activating carbon and linking the two processes and using byproduct steam and heat produced by pollution control systems to support both the production of the char and production of the steam required for carbon activation.

BACKGROUND TO INVENTION

Many industrial processing plants utilize activated carbon to purify waste water by means of adsorption. However, activated carbon must be either replaced with new activated carbon or regenerated to remove adsorbed impurities and to replenish it's absorption properties. Since, activated carbon is costly, processors have been searching for cost effective methods for regenerating the spent activated carbon. Currently, regeneration of spent activated carbon requires that the activated carbon be heated to a temperature of from 400 to over 1000° C. in the presence of steam.

The activation of carbon is an old process that has been carried out in many ways. To produce activated carbon, the carbon feedstock is a carbonaceous substance from which volatile matter has been substantially removed by heating in the absence of air (charring or carbonization), or from which volatile matter is naturally substantially absent. Examples of the former category are coconut char, wood char (i.e., charcoal), and bituminous coke. An example of the other category is anthracite coal of sufficiently low volatile content. The activation is effected by a gasification process that creates a greatly enlarged surface area and an extensive network of submicroscopic pores.

U.S. Pat. No. 4,192,962 (Nakao), filed Mar. 11, 1980, and U.S. Pat. No. 4,261,857 (Nakao), filed Apr. 14, 1981, describe a process where activated carbon is regenerated by passing the particles through a furnace equipped with electrodes that impart heat to regenerate the carbon. The electrodes are placed along the walls of the furnace and define one or more zones. The upper zone is expected to consume the most energy as regenerated activated carbon often contains significant moisture, which must be removed, and the carbon's temperature must be increased from roughly ambient to a target regeneration temperature between 500 to 1,000° C. The Nakao patents describe a system for moving carbon through the furnace entirely by gravity and withdrawal through a single rotary valve. Nakao also describes a furnace where the inner cross-sectional area is gradually decreased and then gradually increased so as to form a throat. This causes a desirable temperature gradient to be formed within the furnace.

Suzuki et al. (U.S. Pat. No. 4,025,610; May 24, 1977) describes a vertical coking furnace consisting of a tube with opposing electrodes positioned at the top and bottom. Although this furnace was primarily operated for the denitrifying of metallurgical coke, it has features similar to an electric furnace applied for the production of activated carbon. Cordier et al. (U.S. Pat. No. 4,867,848; Sep. 19,1989) also describe a vertical coking furnace with an upper portion used to preheat and devolitalize raw ovoids of coal. This is followed by a median section that is electrically heated and used for carbonizing and coking the ovoids, while sustaining a counter-current flow of recycled product gases recovered from the top of the furnace. A cooling chamber is located at the bottom of the furnace.

Gaylord et al. (U.S. Pat. Nos. 5,089,457; Feb. 15, 1992, and 5,173,921; Dec. 22, 1992) describe an apparatus and process for the production of activated carbon using an electrical resistance furnace. In this process, the carbon flows downward by gravity through a cylindrical furnace while an electric current is caused to pass through the bed of carbon particles. Steam is passed into the bottom of the furnace and passes upward through the furnace. Product activated carbon emerges from the bottom of the furnace. Gaylord specifies that the carbon feedstock must have been pre-processed to a temperature of from 550 to 750° C. to achieve low electrical resistance and that the furnace inner radius be no more than 75 times the size-average of the largest dimensions of the carbon feedstock, wherein the size-average is defined as $L(s)=SUM[L^2]/SUM[L]$, wherein L is the largest dimension of a given particle. Assuming that the largest dimensions of the influent carbon particles are an average of 0.05", the furnace should be no greater than 3.75".

Gaylord also describes an apparatus consisting of a preheating chamber located above a reactor vessel supplied with steam at its bottom. The steam is allowed to rise through the reactor vessel and preheater. Electric current is passed between an electrode surrounding the preheating vessel and another located on the outside of the tower reactor vessel.

Gaylord's process and apparatus experience a variety of problems, including limited operating temperatures as a result of materials selection, uncontrolled fluidization of the activated carbon by the rising steam, non-uniform electric field gradients and carbon-flow patterns resulting in widely varying time-temperature histories for particles falling through the proposed reactor. In addition, by using a single electrical-resistance heating zone, Gaylord had limited ability to adjust for variations in energy consumption and temperature gradients along the vertical axis of the reactor.

Another related patent includes that of Hirai (U.S. Pat. No. 5,190,901; Mar. 2, 1993). Hirai describes a method of manufacturing activated carbon consisting of first carbonizing the raw material into an electrically conductive char, followed by activation within a batch furnace equipped with electrodes, and designed to allow the introduction of steam. Hirai (U.S. Pat. No. 5,287,383; Feb. 15, 1994) describes an apparatus for producing activated carbon or regenerating activated carbon. In one embodiment, the carbonizing furnace is a batch furnace followed by an activating unit fitted with a screw conveyor, electrodes, and steam supply. Alternatively, the activating unit is a tunnel furnace with a chain conveyor, electrodes, steam supply, and cooling chamber.

Hiralawa (U.S. Pat. No. 4,127,737; Nov. 28, 1978) describes a rotary drum reactivation furnace equipped with spaced helical electrodes fixed to the inner wall of the drum. Steam can be injected to promote reactivation, while the helical spacing of the electrodes served to propel the carbon from the inlet toward the outlet of the drum.

Du Plessis (U.S. Pat. No. 5,406,582; Apr. 11, 1995) describes an apparatus and process for the activation of carbon in a tubular furnace with two or more descending sections filled with carbon. Each section is equipped with inlets to independently introduce steam into each section and each section is fitted with a graphite electrode positioned at the center and top of each section and attached to a steep shelve equipped with openings to allow gases and vapors to escape.

Another singular apparatus is the Minfurn activated carbon regeneration furnace developed in South Africa and described in U.S. Pat. No. 5,317,592 of Van Staden (May 31, 1994). In this system, spent carbon is regenerated by passing the carbon by gravity between spaced electrodes in a tubular furnace. The control system utilizes the current flow as an indirect measure of the electrical resistance of the carbon, which obviates the need for direct temperature measurement within the furnace. Moss (U.S. Pat. No. 4,807,246; Feb. 21, 1989) also describes a South African furnace for treating granular activated carbon and consisting of a vertical column with a pair of spaced electrodes. Carbon flows through these electrodes by gravity and out a valve located at the bottom of the furnace. A central cone is provided to control the flow of carbon and to prevent serious segregation.

Baxter et al. (U.S. Pat. No. 5,579,334; Nov. 26, 1996) describe a rotary furnace equipped with spaced electrodes that allow direct resistive heating of a solid particulate medium. Hirakawa (U.S. Pat. No. 4,127,737; Nov. 28, 1978) also describes a rotary furnace, but with a series of helically spaced electrodes that are affixed to the inner wall of the furnace drum. The electrodes not only provide resistive heating, but also propel the material toward the outlet of the furnace. The furnace is designed to dry and reactivate activated carbon.

Quisser et at. (U.S. Pat. Nos. 4,655,968; Apr. 7, 1987 and 4,760,585; Jul. 26, 1988) describe a furnace equipped with electrodes for direct electric heating. However, this furnace is designed for the combustion of the incoming carbon and reduction of the residual to a slag for disposal.

A multi-electrode furnace is described by Eirich et al. (U.S. Pat. No. 4,624,003; Nov. 18, 1986). The furnace is equipped with generally planar pairs of electrodes that are mounted at an angle from the furnace walls. Each pair of electrodes is electrically isolated from the other electrode pairs. The electrical energy applied to each pair of electrodes can be separately adjusted. Din and Eirich (U.S. Pat. No. 5,694,413; Dec. 2, 1997) describe a furnace with at least one pair of electrodes arranged one above the other and are used to heat an electrically conductive medium passing by gravity through the furnace.

Mihara et al. (U.S. Pat. No. 4,398,295; Aug. 9, 1983) describe an apparatus for regenerating activated carbon and comprising a desorption tank having at its bottom a sloped tubular furnace lined with electrodes. As the activated carbon flows through the furnace tube, it is intercepted by transverse weirs at spaced intervals. Movement of the tank causes the activated carbon to flow along the furnace tube and causes the carbon particles that have been regenerated and have thereby become lighter, to flow over the weirs in preference to particles that are more dense and have not been completely reactivated.

Mizuno et al. (U.S. Pat. Nos. 4,139,489; Feb. 13, 1979, and 4,149,023; Apr. 10, 1979) describe a method of continuously regenerating activated carbon by passing particles through vertically spaced electrodes located in a tubular furnace. Particles flow through apertures of a defined size within the electrodes, filling the space between the electrodes.

Aubry et al. (U.S. Pat. No. 4,357,210; Nov. 2, 1982) describe a furnace for the calcination of carbonaceous materials and containing electrodes that pass current through the charge, while passing a non-reactive gas in the opposite direction to the movement of the charge.

Halm (U.S. Pat. No. 4,472,245; Sep. 18, 1984) describes a continuous process for the thermal treatment of carbonizable material. The process uses a vertical furnace and is charged with wood, cellulose, or some alternative substrate. The furnace has an upper and lower electrode. The charge moves slowly downward. Heat transfer to the upper portion of the furnace, causes the material to carbonize at the upper portion of the unit and become electrically conductive. This carbonized material eventually reaches the space between the electrodes where it is heated and exposed to steam. Movement through the furnace is induced by withdrawal of product from the bottom of the furnace.

It can be seen that direct resistive heating of carbon within a furnace is an established method in the art. However, it remains rarely applied in actual practice in comparison with more conventional rotary direct and indirect fired furnaces or multi-hearth furnaces. This failure to achieve significant commercial implementation, is the result of many deficiencies in the practical elements of electric furnaces. The current invention attempts to correct these deficiencies.

One of the first problems with electric furnaces operating with a flooded volume of particulate material relates to efficiently passing steam through the particulate mass. It is often observed that in many situations, steam moving in the up-flow direction emerges with great force from the top of the furnace carrying fluidized hot carbon particles. In practice, conventional electric furnaces, most of which have operated in the gas-phase upflow direction, have greatly reduced steam and gas throughput to avoid fluidization. Rotary and multi-hearth furnaces do not suffer from these limitations because the particulate mass does not occupy the entire volume of the furnace, allowing for steam to pass through a particle-free zone of the furnace.

Particle-flooded electric furnaces that heat the carbon using direct resistive heating have been generally confined to activated carbon regeneration, which requires far less steam and lower temperatures than activated carbon production. The problem becomes clear when one calculates the pressure drop required to pass sufficient steam through a bed of carbon particles. The present inventor has calculated the pressure drop using the Ergun and Orning equation (Ergun, S. "Fluid Blow Through Packed Columns", Chem. Eng. Progress, 48(2), Febuary 1952), where:

$dP/L = [150 (1-f)^2 Gu]/[g_c f^3 P_g (D_p)^2$

G=specific mass flow rate in lbs./hr.- sq. ft.

u=fluid viscosity in lbs./ft.-hr.

$g_c$=gravitational acceleration in ft/hr$^2$ $P_g$=fluid density in lb/ft$^3$ and $D_p$=particle diameter in ft.

TABLE I

| Sample Furnace Conditions | |
|---|---|
| Steam Flow | 6,000,000 lbs. steam/gas at 1200° K. |
| Furnace Internal Diameter | 2.00 ft. |
| Steam Supply Pressure, | 75 psi |
| Specific Mass Flow Rate, G | 300 lbs/hr - sq.ft. |
| Void Fraction, f | 0.40 |
| Fluid Viscosity for Steam/Gas Mix, u | 0.10 lbs./ft. - hr. |
| Acceleration of Gravity, $g_c$ | 4.15 × 10$^8$ ft/hr$^2$ |
| Fluid Density, $P_g$, STP | 0.008 lbs.ft.$^3$ |
| Particle Diameter, $D_p$ | 0.04 ft. |

Table 1 above set forth the conditions of an electric furnace having an internal diameter of 24 inches and producing 3,000,000 pounds of activated carbon per year. Using the conditions set forth in Table 1, one can solve the steam flow equations, by assuming that steam inlet pressure must be approximately equal to the pressure drop through the bed of carbon. Fluid density and viscosity of the elevated steam pressure must be corrected, which is simplified when the steam gauge pressure is set to equal dP and when one assumes that the change in fluid viscosity at these low pressures can be neglected.

This solution yields a steam gauge pressure of 4.0 psig/ft of reactor length under the Table 1 conditions. This large pressure drop makes it impractical to operate electric furnaces for carbon production. Not only is the volume of steam too large, but passing this steam in the up-flow direction greatly exceeds the fluidization limit. The furnace contents will become fluidized when dp/L is greater than bulk density/144. Since the bulk density of activated carbon is perhaps 30 pounds/ft$^3$, the maximum upflow pressure drop is only 0.2 psid. The required steam flow is approximately twenty times greater than the fluidization limit.

One possible solution to the fluidization problem evident in the prior art is to operate the furnace at reduced steam flow, but this would directly reduce the capacity of the furnace to produce carbon. Alternatively, the furnace can be operated to regenerate carbon, which requires far less steam than production of new activated carbon from a suitable substrate. Another possibility is to break the furnace into several sectors with separate injection and removal of steam, each sector receiving only a fraction of the total steam required for the process. A combination of the two latter methods has often been used, but when producing activated carbon, rather than carrying out regeneration, productivity is certain to be greatly reduced by this steam problem.

Another possibility is to pass the steam in the down-flow direction, co-current with the flow of activated carbon granules. However, this will result in substantial dynamic forces upon the bed of particles. These forces accumulate in the direction of steam flow and must be dissipated by frictional forces between the carbon particles and the furnace walls, reactor internals, and supported by the carbon particles themselves. Unfortunately, activated carbon particles are not strong and serious crushing would be experienced if steam differential pressures are too large. For example, total dynamic dP at the bottom of a furnace will rise to 63.2 psid, and would be combined with a static pressure of 4.2 psi, if the carbon bed in Table 1 is 20 ft. in depth. Activated carbon particles are generally not able to withstand these crushing forces.

Steam flows of these proportions would also be expected to cause substantial attrition as a result of lateral von Karmen forces. These forces cause adjacent particles to oscillate and the resulting collisions would be expected to cause unacceptable formation of powdered activated carbon within the furnace. However, it has been found that von Karmen forces, and their resulting attrition, can be minimized by processing the carbon in a sufficiently short time frame, i.e., in a few hours. This leaves the problem of avoiding high dynamic crushing forces.

To minimize fluidization effects, it has been discovered by the present inventor that steam must be passed down through the carbon bed. To avoid a large accumulation of dynamic pressure at the bottom of the furnace, the dynamic force of the steam passing through the bed must be interrupted by internal structures that serve to dissipate the force at regular intervals. Because the carbon particles are not a conventional fluid, a force developed within the particle bed can be efficiently transferred from the particles to the walls of the furnace or to suitable baffles located at regular intervals along the length of the furnace. This transfer of downward force dissipates the dynamic pressure and prevents the development of pressures exceeding the crush strength of the carbon.

Whatever structures are used to dissipate dynamic loads, they must also allow the efficient movement of the carbon down the length of the furnace without causing serious non-uniform particulate flow patterns or wall effects. If possible, they should serve to dissipate these anticipated wall effects. The present inventor has discovered that a series of electrodes that simultaneously absorb this dynamic load, pass the carbon particles, and establish good electrical connections to the particle bed would satisfy the above structural requirements.

The present invention provides a method and apparatus which is capable of reactivating carbon with 50% more efficiency than conventional reactivation system. The present inventor has discovered that such an efficient system may be created by feeding steam co-currently with the downflowing carbon particles in the electric furnace so that no fluidization of the particles occurs. This is accomplished using a novel graphite electrode design that provides maximum contact with the downflowing carbon.

The present invention also provides many additional advantages which shall become apparent as described below.

SUMMARY OF THE INVENTION

A reaction vessel which is capable of activating or reactivating a carbonaceous material, the vessel comprising: a housing; a means for introducing the carbonaceous material into the housing; at least one primary heating zone formed between a pair of upper electrodes, wherein at least one upper electrode comprises an upper portion and a lower portion, the lower portion being formed of a side wall having an angle less than the angle of repose of the carbonaceous material, and wherein the carbonaceous material passing through the primary heating zone is resistively heated in a suitable atmosphere to accomplish activation or reactivation of the carbonaceous material; and a means for introducing an activation gas into the space above the primary heating zone and allowing the gas to pass through the primary heating zone to be collected and removed from the housing below the bottom electrode (i.e., activation gas is introduced and removed outside of the heating zones), whereby the activation gas (e.g., steam, carbon dioxide, etc.) traverses through the housing in a co-current direction with the carbonaceous material, whereby the energy efficiency of the vessel is improved over conventional activation vessels.

Preferably, the reaction vessel comprises a secondary heating zone formed between one of the upper electrodes and a bottom electrode.

The upper and bottom electrodes are formed of graphite and have at least one aperture disposed therein to provide maximum contact between the carbonaceous material and the surfaces of the upper and bottom electrodes. The upper and lower portions of the upper electrodes have a unique triangular-shape. The bottom electrode has a pentagonal shape, thereby providing particle-free zones below the bottom electrode for the purpose of collecting the activation gas within the reactor vessel.

The reaction vessel typically comprises at least three upper electrodes, wherein the upper electrodes form a first primary heating zone, a second primary heating zone and a third primary heating zone, and wherein a first secondary heating zone is disposed between the third primary heating zone and the bottom electrode. The total number of upper and bottom electrodes is E=Z+1, where Z is the number of primary and secondary heating zones within the vessel.

The housing of the reaction vessel preferably comprises an interior surface formed of ceramic or other non-conductive material which is capable of handling high temperature.

The present invention also include an integrated system for activating or reactivating a carbonaceous material, the system comprising: a means for producing char from the carbonaceous material; a means for introducing an inert gas to the means for producing char; a means for activating or reactivating the char, thereby forming an activated or reactivated carbonaceous material; a means for introducing an activation gas to the means for activating or reactivating the carbonaceous material; and a means for recovering heat from off gases generated from the production of the char and activation or reactivation of the char, wherein the off gases are used to heat the inert gas and the steam, and is carried to the char production vessel by a heat transfer medium such as air or hot oil; whereby the energy efficiency of the system is improved over conventional activation systems.

The means for recovering heat further comprises a means for removing impurities from the off gases.

The means for producing char is a char production vessel comprising a housing, a means for introducing the carbonaceous material to a first end portion of the housing, a means of introducing the inert gas to a second end portion of the housing, and a means for removing an off gas from a first end portion of the housing. The second end portion of the housing is connected to the means for activating or reactivating the char. Heat is carried to the char production vessel by heat transfer medium such as air or hot oil circulation in pipes or within surfaces physically isolated from the inert gas filled atmosphere of the char production vessel.

The means for recovering heat from off gases comprises: a waste gas treatment unit; a gas heater unit; and a steam generator unit. The gas heater unit is preferably disposed between the waste gas treatment unit and the steam generator unit, such that the off gases from the means for producing char and from the means for activating or reactivating char first pass through the waste gas treatment unit, then through the gas heater unit and finally through the steam generator unit. The gas heater can be zoned to separately heat an inert gas that is injected into the bed of carbonaceous material within the char production vessel and a second gas such as air, which is used to indirectly heat the contents of the char production vessel. The steam generator can also be an indirect heated unit using hot oil as an intermediate heat-to-steam medium.

The carbonaceous material is at least one selected from the group consisting of: coal, coconut shells, cellulosic material, and petroleum products, or other high-carbon substrates suitable for the production of activated carbon.

The present invention also includes a process for activating or reactivating a carbonaceous material using the reaction vessel or system described above.

Other and further objects, advantages and features of the present invention will be understood by reference to the following specification in conjunction with the annexed drawings, wherein like parts have been given like numbers.

BRIEF DESCRIPTION OF THE DRAWINGS

FIG. 4 is a schematic diagram of the electrical system used to control the activated carbon product furnace of the present invention.

DESCRIPTION OF THE PREFERRED EMBODIMENTS

Figure 1:
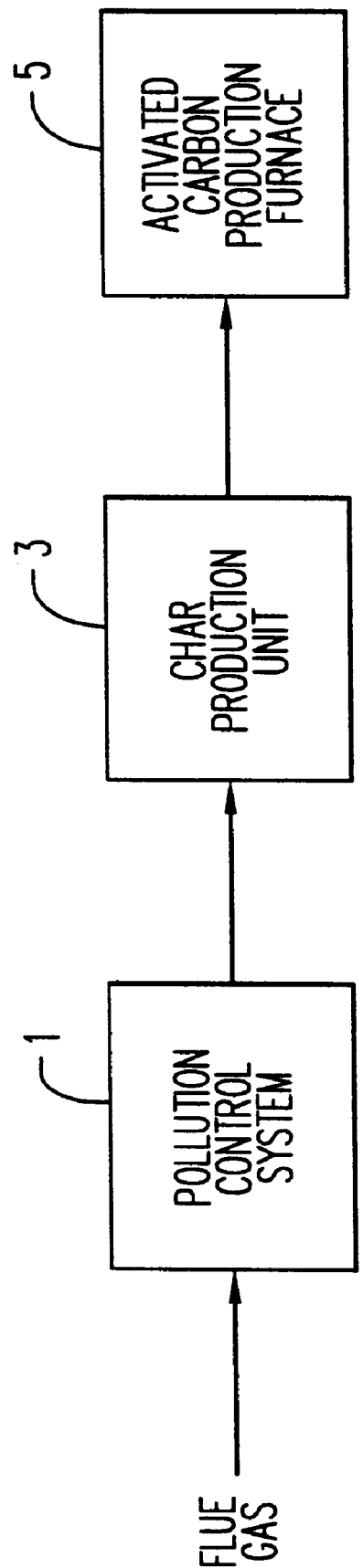
FIG. 1 is a block diagram of the activated carbon production process according to the present invention.

FIGS. 3a–e show the design of the novel graphite electrode suitable for use in dramatically improving the energy efficiency of a carbon activation or reactivation system. If such an electrode supports 4 ft. of packed activated carbon operating with a steam flow as shown in Table 1, the total dynamic load would be expected to be 5,800 pounds, assuming no dissipation of force against the vertical furnace walls. The electrode is manufactured from high quality graphite of thick cross section. Into this graphite slab is machined a series of passages that direct the particulate material and steam/gas moving down along the wall of the furnace toward the center and from the center toward the wall. The angle of the slot wall to the vertical is not allowed to exceed the typical angle of repose of carbon granules (approximately 25–30°). This allows the carbon particles moving through the electrode to retain good electrical contact on all surfaces and obtains an optimal transmission of electrical energy into the particulate mass.

The dynamic forces upon the carbon bed above the graphite electrode, as well as the weight of the carbon bed, are transferred to the electrode, which serves as a baffle. It has been found that a thick electrode cross section allows the electrode to be self-supporting and this thick electrode can be attached to the adjacent furnace wall. It should be clear that the electrode serves a total of four functions, including:

1) providing electrical energy,
2) supporting the weight and forces within the particle bed, while allowing free passage of solids and gases,
3) limiting wall effects for both gas moving at high velocity along the wall and for particles moving slowly along the wall of the furnace, and
4) mixing particles moving along the central axis of the furnace with particles emerging from the walls of the furnace to limit non-uniform process exposure to different particle populations.

Electric Supply Isolation and Control

It is desirable to operate different sections of the activated carbon production or regeneration furnace under different operating conditions. For example, the uppermost portion of the furnace often exhibits a bulk resistance that is quite different from lower sections. This is the result of lower-temperature char entering the top of the furnace. As this char is progressively heated and activated, the electrical resistance of the carbon changes. In addition, the upper section of the bed must raise the temperature of the incoming substrate, drive off any residual volatile material, and perform other energy-intensive work. Later sections of the bed must only sustain the endothermic activation reaction.

To allow independent energy input into each section of the furnace, multiple furnace zones, fitted with separate pairs of electrodes, and isolated electrical supplies, have been used.

Isolation transformers combined with AC to DC rectification have been used in multi-electrode pair arrangements. However, this leads to an expensive multi-circuit apparatus and high cost.

To eliminate these problems, it would be desirable to pass AC current through the multiple zones of the furnace, while allowing accurate control and monitoring of the current and preventing bifurcation of input current into more than one zone. To accomplish this, an electrical system as shown in FIG. 4 might be used. In this concept, the electrical system consists of multi-zone isolated circuits where each electrode along the furnace is shared by the adjacent zone, if any. This arrangement takes advantage of the graphite electrode construction and reduces the number of electrodes within the system by to Z+1, where Z is the number of independent zones within the system.

Another alternative power system involves providing only a single AC power injection unit. This unit is connected to a series of solid-state switches that allow power to be injected into each zone of the furnace based upon a signal from a conventional temperature controller and thermocouple installed in each zone. The switch can direct power to each zone by accomplishing a transfer of power as the voltage passes zero during each AC cycle. This zero cross over time-domain power injection system is less expensive than the multi-zone furnace power system because it eliminates the extra isolation transformers and SCRs. Power is directed to those zones calling for power injection to sustain set-point temperature and a controller can be programmed to direct power preferentially to the upper zone, which generally requires the most power.

It has been noted in much of the prior art, that materials of furnace construction have often limited the operating temperature of the furnace. The current design utilizes only refractory materials and graphite electrodes. No metallic components are used to create static particle mixing, provide electrodes, or as structural supports. This allows the furnace to operate for extended periods at exceedingly high temperatures, providing higher productivity, faster reaction rates, and long periods between furnace maintenance. A minimum of internal components are used because the electrodes serve as static mixers, structural supports and play their electrical role. The use of electrodes that are carefully crafted to maintain a maximum degree of contact with the surrounding activated carbon prevents localized heating of the electrodes and extends electrode life. Prior art designs often have an effective surface area between the electrode and particulate carbon that is significantly less than the cross sectional area of the furnace. This causes current flow to become concentrated adjacent to the electrode surface, resulting in a serious thermal gradient and non-uniform process performance.

Certain prior art describes furnace designs that avoid the steam flow problems by allowing a short circuit to form between the site of steam injection and site of steam withdrawal within the furnace. However, these short circuit pathways allow large volumes of carbon to be starved for critical reactant steam and seriously reduce the productivity of the furnace, especially when producing activated carbon. In addition, some furnaces have junctures where seriously altered furnace geometry results in substantially non-uniform temperature profiles within the furnace.

The current invention provides for highly uniform co-current flow of steam down through the particle bed with a single injection point at the top of the furnace and a single withdrawal point at the bottom of the furnace. Withdrawal is simplified at the bottom of the furnace by providing an electrode at this location that creates particle free zones where steam can be withdrawn from particle-free areas below the bottom electrode. The particle-free zone is created under flat sections of the electrode, where steam and reactant gases are withdrawn at low velocity. The furnace bottom electrode edge slots can be designed with an angle exceeding the angle of repose of the granular carbon under these conditions.

At each electrode, the edge of the electrode can be designed to force particles and gas moving along the wall of the furnace in toward the center of the furnace. Gases tend to move more rapidly along the furnace wall, while particle movement is retarded. The combination would be especially difficult and lead to excessive activation of carbon at the wall, if it were not for the fact that the furnace wall is also cooled by heat losses to the environment surrounding the furnace. In a flowing mass of carbon, we would expect that electrical resistance would be non-uniform, with higher resistance in the center of the bed. This leads to a more uniform temperature gradient, as electrical energy would be directed toward the wall where particle packing would be tightest. These various counter-balancing factors make an exact solution of the temperature and flow gradients within the furnace, very difficult to calculate.

According to the present invention, steam flows co-current to the carbon passing through the electrode. The current invention eliminates the various injection and withdrawal points for steam as required by conventional processes and does not allow a short circuit of steam flow.

Often, the activated carbon production furnace is designed as a component, without significant effort to produce an integrated production process. This often leads to higher capital costs and reduced efficiency because the remaining elements of the system are not properly integrated. In many cases, significant amounts of energy can be saved through such integration.

Figure 5:
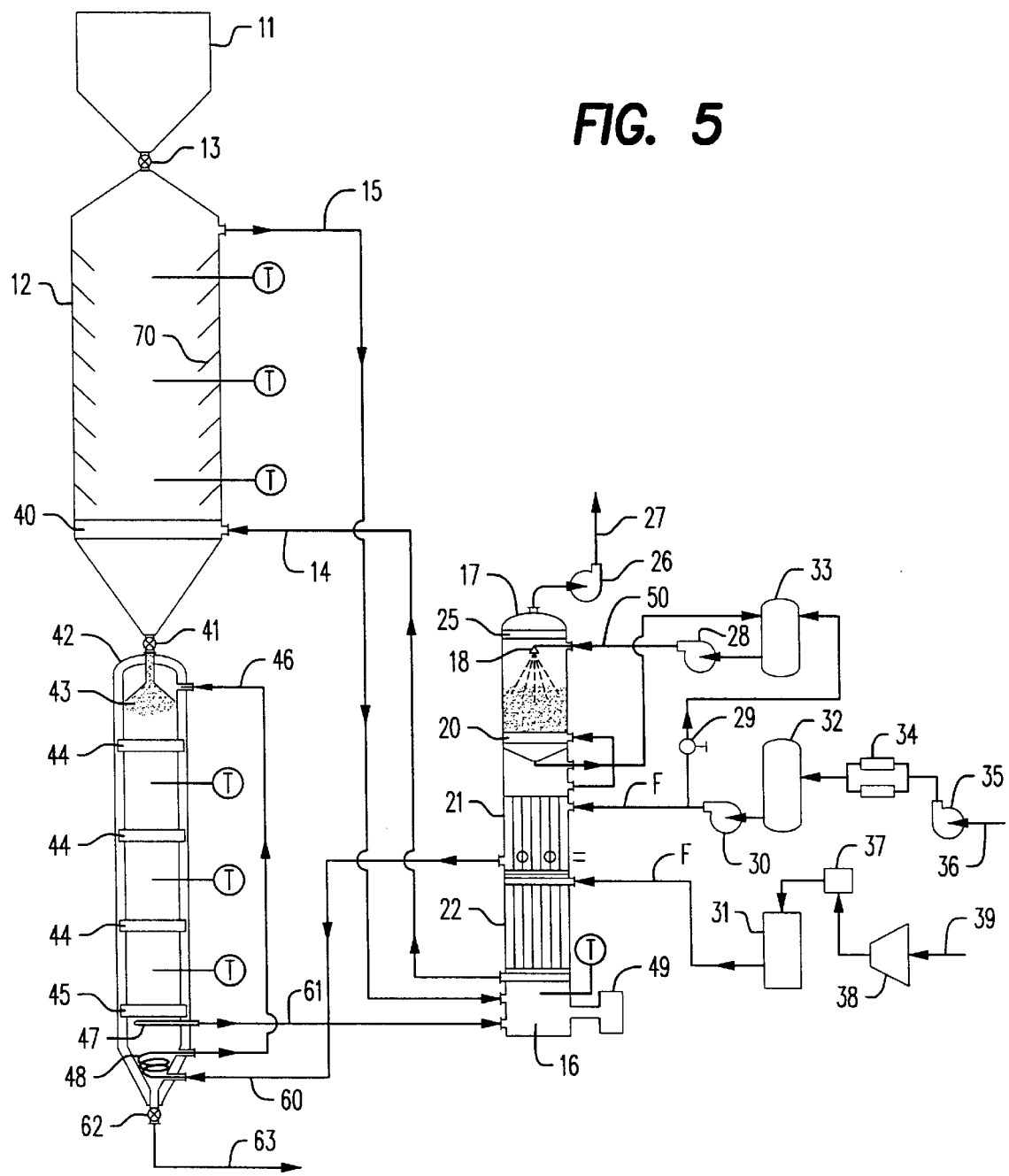
FIG. 5 is a schematic cross-sectional view of an integrated activated carbon production unit according to the present invention.

FIG. 1 shows a block diagram of an integrated activated carbon production process. In this process, pollution control system 1, char production unit 3, and activated carbon production furnace 5 are operated as a single unit. They are integrated tightly as shown in FIG. 5 into a single operating unit, linked through a waste heat recovery unit, which produces hot inert gas and heat transfer medium for the production of char and produces steam for use in the activation of carbon. Heat is generated for all processes within an after-burner where gases emerging from the char and activated carbon production processes are burned, together with supplemental fuel such as oil or natural gas. The after-burner is used to eliminate significant volatile organic compounds (VOCs) from the effluent gas stream and is therefore the main pollution control system for the entire production process.

The integrated activated carbon production process according to the present invention is best understood by reference to FIG. 5, wherein raw material, such as wood chips, coal, coconut shell etc, is loaded into hopper 11 and thereafter metered out to char production furnace 12 via rotary valve 13. While the raw material particles are flowing downward through furnace 12, hot nitrogen is injected from conduit 14 and distribution manifold 40 into the bottom of furnace 12 such that the nitrogen flows counter-current to the raw material particles, wherein the raw material is reduced to a carbonaceous char. Hot nitrogen gas is then removed from the top portion of furnace 12 via conduit 15 and return to waste gas treatment unit 16. Primary heating of furnace 12 can be accomplished using indirect heat obtained by passing air through heat exchange tubes installed within after-burner or pollution control incinerator 49 and passing this heated air through a series of tubes installed within furnace 12 (not shown).

Nitrogen delivered to char production furnace 12 is preferably produced by injecting air 39 via compressor 38, after cooler knock-out pot coalescing filter 37 and nitrogen separator 31 into inert gas heater 22 wherein the nitrogen is heated within waste gas treatment unit 16 to temperatures exceeding 750° C. The heated nitrogen gas then exits heater 22 via conduit 14 into furnace 12.

Figure 2:
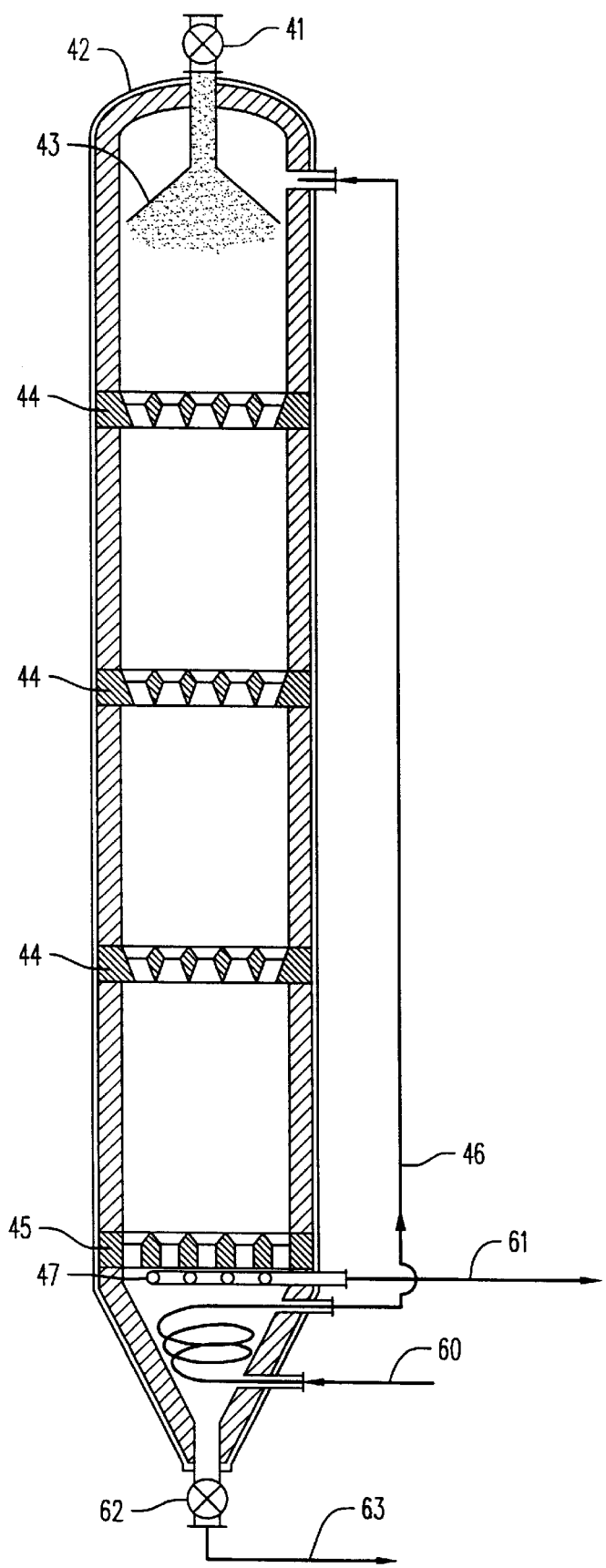
FIG. 2 is a schematic cross-sectional view of an activated production furnace according to the present invention.

The carbonaceous char exits furnace 12 via rotary valve 41 into activated carbon production furnace 42 (shown in greater detail in FIG. 2). The char is dispersed evenly throughout the width of furnace 42 via conical diverter 43 and thereafter passes through upper graphite electrodes 44 and lower graphite electrode 45. Steam is injected into the top portion of furnace 42 via conduit 46 so as to move co-currently with the char through furnace 42. That is, the steam is preferably injected above the primary heating zone, i.e., above the upper most upper electrode 44, to avoid the arcing typically caused by conventional injection of steam into an electrically active portion of the furnace, which causes fluidization and arcing within the furnace.

The steam fed to activated carbon production furnace 42 via conduit 60 is produced by injecting water from a source via conduit 36 and pump 35 to reverse osmosis member unit 34, thereby forming a low temperature steam generator feed water with low total dissolve solids content. The low solids content water is held in tank 32 and thereafter injected, via pump 30, into steam generator 21, wherein the water is passed through heat exchange tubes which are heated by upflowing waste gases from furnace 12 and furnace 42. The resulting steam is directed to the bottom of activated carbon production furnace 42 which is fitted with a further heat exchanger 48 designed to allow the hot activated carbon product to fall through the exchanger. This further heating super heats the steam and cools the activated carbon product prior to its emerging from furnace 42. The steam is then directed to the top of activated carbon furnace 42 via conduit 46 where it passes through the length of the activated carbon bed in co-current flow to the carbon. The residual steam and gases produced during the activation process are collected at the bottom of activation furnace 42 via steam/gas collection manifold 47 disposed below electrode 45. From there, these gases are directed to after-burner 49 and waste gas treatment unit 16 via conduit 61 for complete oxidation and destruction.

The activated or regenerated carbon is then discharged from the system via rotary valve 62 and conduit 63 for storage or tankage.

Waste gases emerging from the low-temperature recouperator or steam generator 21 are directed via gas distribution manifold 20 to a final packed column wet scrubber or similar device 17 to remove any residual acid gases. These scrubbed gases are then released to the environment through a blower 26 and conduit 27, which provides suction on the entire system. The water for spray device 18 is diverted from tank 32 via conduit 29 and water tank 33. The water is pumped to spray device 18 via pump 28 and conduit 50. FIG. 5 shows that these major systems can be fabricated as a pair of towers fitting within an extremely small area and closely coupled to minimize heat losses and piping complexity. The towers are supported from a single tower framework fitted with conventional access platforms and supplemental compressors, pumps, and maintenance equipment would be installed within the tower as per conventional practice.

It should be clear that the above-mentioned process operates best when a char unit can be fed an appropriate substrate that is capable of being reduced to a carbonaceous char and then directly activated. This arrangement is optimized when intermediate grinding, sieving, and handling of the char is not required. Hot char directly discharged from the pyrolysis unit is allowed to directly enter the activation furnace, thereby reducing the amount of energy required to bring the char to activation temperatures. Energy used to provide pollution control is used to indirectly fire the char pyrolysis unit and produce process steam. Any disparity in the amount of energy required to fulfill the pollution control, pyrolysis, and activation processes, is made up by increasing the supplemental fuel supplied to the after burner.

This degree of integration is estimated to allow a reduction in energy consumption of up to 50% in comparison to conventional methods where char production and activation are separated and where process steam is produced in a separate boiler. In addition, capital costs are greatly reduced in this system because numerous separate pieces of equipment have been combined into two simple process towers. The only mechanical equipment within these towers are the rotary valves that control the flow of carbon. All other mechanical systems are located outside the towers for simple maintenance.

Figure 3B:
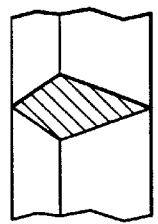
FIG. 3b is a cross-sectional view along line B—B of FIG. 3a of an upper electrode.
Figure 3C:
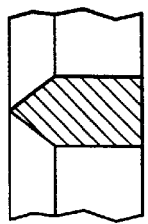
FIG. 3c is a cross-sectional view along line B—B of FIG. 3a of a lower electrode.
Figure 3D:
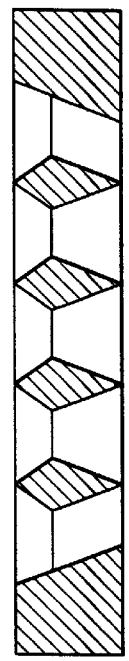
FIG. 3d is a cross-sectional view along line A—A of FIG. 3a of an upper electrode.
Figure 3E:
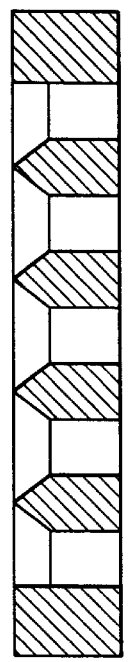
FIG. 3e is a cross-sectional view along line A—A of FIG. 3a of a lower electrode.
Figure 3A:
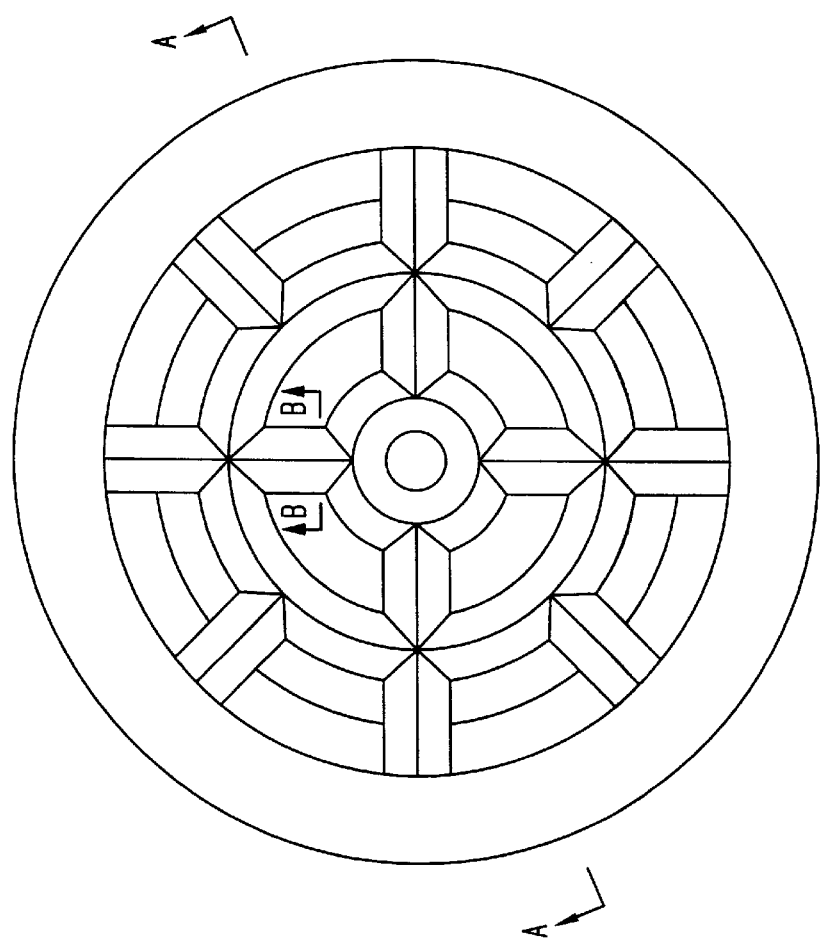
FIG. 3a is a top planar via of a graphite electrode in accordance with the present invention.

FIGS. 3a–e depict the novel graphite electrode according to the present invention. FIGS. 3b and 3d depict upper electrodes 44 and FIGS. 3c and 3e depict lower electrode 45. It is critical according to the present invention that the upper electrodes have a diamond shape wherein the lower triangular walls have any angle less than the angle of repose for carbonaceous material, thereby the carbonaceous material passing through the upper electrode remain in contact with the lower surfaces of the upper electrode to create lower current density at the electrode surface then in conventional electrodes and thereby substantially reduces the temperature adjacent t the electrode surface and reduces violent arcing, which is the primary cause of electrode wear. That is, the carbonaceous material remains in contact with the electrode throughout its travel past the electrode, even on the lower side of the electrode so that disconnects are avoided. Smooth release of carbon particles prevents sudden separations that cause arcing and any residual arcing is at low current and produces minimal damage to the electrode surface. Moreover, the configuration of the electrodes make it possible to pass carbonaceous material and gases in co-current flow.

When multiple heating zones are used in the activation furnace, the electrodes are shared by adjacent heating zones, hence allowing a reduction in the total number of electrodes. That is, the present inventors have developed an activation furnace where the number of electrodes is determined in accordance with the following formula: $E=Z+1$, wherein E is the number of electrodes and Z is the number of heating zones, whereas conventional activation furnaces often have the number of electrodes determined by the following formula: $E=2Z$, i.e., nearly twice as many electrodes as the present invention.

Lining the activation furnace with a ceramic material provides temperature resistance and insulation to prevent heat loss. Baffles 70 prevent gas moving along the side walls of the furnace, since gas moves faster along side walls than through the center of the column. Therefore, baffles 70 force the gases off the wall and into the center of the column for more effective contacting with the carbonaceous material moving therethrough. Optionally, off gases from char and activation units can be sent to a turbine or cogeneration system (not show).

FIG. 4 is a schematic representation of the electric circuitry used to operate the system according to the present invention. The unique electrode configuration and the corresponding electric circuitry depicted in FIG. 4 provide a unique system and method for activating carbon in less time and using less power than conventional carbon activation systems.

Using a PC or PLC-based controlled system, the system scans the output of each zone's temperature controller 80 and examines which heating zone(s) are calling for power injection. The system then directs power from power meters 81 into a given zone through control of a series of SSR or SCR-type silicon switches 82. A pair of such SCR-type silicon switches are selected and energized, preferably during the zero voltage portion of the AC cycle. Each such pair of switches 82 defines a single electrode pair, one at the top and one at the bottom of each heating zone. Therefore, FIG. 4 depicts the electronic circuit required for a three heating zone activation furnace.

Because cold steam enters the top of the reactor, the logic system selects any heating zone located at the top of the reactor in preference to heating zones that might be calling for power at the lower portions of the activation furnace. This is the result of high energy consumption at the upper zone and relatively low power consumption in the lower zones. As such, the upper zone requires more power injection and generally displays a more rapid change in temperature if left without power than the lower zones.

Hence, for a three zone system in accordance with the preferred embodiment of the present invention, there are four electrodes and three pairs of solid-state switches 82 controlled by a logic controller.

It will be clear that schematic FIGS. 1 and 5 do not completely describe the detailed operation or detailed components used within the process. These would including temperature, pressure, flow, and capacitance sensors, pumps, compressors, valves, and other actuators and process equipment; and a control system comprising a PC or PLC control system used to operate the process. However, those skilled in the art will appreciate the substance of the invention described herein.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A reaction vessel which is capable of activating or reactivating a carbonaceous material, said vessel comprising:

a housing;

a means for introducing said carbonaceous material into said housing;

at least one primary heating zone formed between a pair of upper electrodes, wherein at least one upper electrode comprises an upper portion and a lower portion, said lower portion being formed of at least one side wall having an angle less than the angle of repose of said carbonaceous material, and wherein said carbonaceous material passing through said primary heating zone is resistively heated in a suitable atmosphere to accomplish activation or reactivation of said carbonaceous material; and a means for introducing an activation gas outside of said primary heating zone such that said activation gas traverses through said primary heating zone in a co-current direction with said carbonaceous material, thereby activating or reactivating said carbonaceous material.

2. The vessel according to claim 1 further comprising: at least one secondary heating zone formed between one of said upper electrodes and at least one bottom electrode.

3. The vessel according to claim 2 wherein said upper and bottom electrodes are formed of graphite.

4. The vessel according to claim 1 wherein said means for introducing said carbonaceous material into said housing is disposed above said primary heating zone.

5. The vessel according to claim 3 wherein said upper and lower portions of said upper electrode have a triangular-shape.

6. The vessel according to claim 2 wherein said bottom electrode has a pentagonal shape, thereby providing particle-free zones below said bottom electrode for the purpose of collecting said activation gas within said vessel.

7. The vessel according to claim 2 wherein said vessel comprises at least three upper electrodes.

8. The vessel according to claim 7 wherein said upper electrodes form a first primary heating zone, a second primary heating zone and a third primary heating zone, and wherein said secondary heating zone is disposed between said third primary heating zone and said bottom electrode.

9. The vessel according to claim 2 wherein the total number of upper and bottom electrodes is Z+1, where Z is the number of primary and secondary heating zones formed within said vessel.

10. The vessel according to claim 1 wherein said housing comprises an interior surface formed of ceramic or other non-conductive material which is capable of handling high temperature.

11. The vessel according to claim 8 further comprising a means for selectively providing power to each heating zone based upon each said heating zones individual power requirements.

12. The vessel according to claim 11, wherein said means for selectively providing power comprises:

a means for detecting the temperature of each said heating zone;

a means for determining the power requirements of each said heating zone based upon the detected temperature compared to a predetermined temperature; and a switching means for directing power to said heating zones based upon the determined power demand for each said heating zone.

13. The vessel according to claim 1 wherein said carbonaceous material is at least one selected from the group consisting of: coal, coconut shells, cellulosic material, and petroleum products.

* * * * *